United States Patent
Lynch et al.

(10) Patent No.: US 9,338,303 B2
(45) Date of Patent: May 10, 2016

(54) WIRELESS ENTERPRISE CONGESTION MANAGEMENT

(71) Applicant: AVAYA, INC., Basking Ridge, NJ (US)

(72) Inventors: John Lynch, Belleville (CA); Allan Lesperance, Stirling (CA)

(73) Assignee: Avaya Inc., Basking Ridge, NJ (US)

( * ) Notice: Subject to any disclaimer, the term of this patent is extended or adjusted under 35 U.S.C. 154(b) by 127 days.

(21) Appl. No.: 13/871,545

(22) Filed: Apr. 26, 2013

(65) Prior Publication Data
US 2014/0323100 A1    Oct. 30, 2014

(51) Int. Cl.
*H04M 1/725* (2006.01)
*H04M 3/51* (2006.01)
*H04M 7/12* (2006.01)
*H04M 1/60* (2006.01)

(52) U.S. Cl.
CPC ............ *H04M 7/12* (2013.01); *H04M 1/72502* (2013.01); *H04M 1/6066* (2013.01); *H04M 3/5133* (2013.01)

(58) Field of Classification Search
CPC ..... H04W 24/00; H04W 28/00; H04W 28/02; H04W 40/12; H04W 40/04; H04W 76/02; H04M 1/72511; H04M 1/6041; H04M 2203/40; H04M 2203/401; H04M 2203/406; H04M 2250/02; H04M 1/7253; H04M 1/6066; H04M 1/6058; H04M 1/05; H04M 1/6075

USPC .................. 455/450, 452.2, 452.1, 464, 41.2
See application file for complete search history.

(56) References Cited

U.S. PATENT DOCUMENTS

| | | | |
|---|---|---|---|
| 6,330,325 B1 * | 12/2001 | Reid et al. ................. | 379/265.01 |
| 6,484,027 B1 * | 11/2002 | Mauney et al. ................ | 455/421 |
| 6,560,329 B1 * | 5/2003 | Draginich et al. ........ | 379/265.02 |
| 6,816,733 B1 * | 11/2004 | Dezonno et al. ............ | 455/456.1 |
| 2002/0094778 A1 * | 7/2002 | Cannon et al. ................... | 455/41 |
| 2003/0176200 A1 * | 9/2003 | Harrison ....................... | 455/500 |
| 2009/0175439 A1 * | 7/2009 | Jian ......................... | H04M 1/08 379/433.06 |
| 2010/0112950 A1 * | 5/2010 | Haartsen et al. .............. | 455/41.3 |
| 2012/0028642 A1 * | 2/2012 | Schliwa-Bertling .......... | 455/436 |

* cited by examiner

*Primary Examiner* — Marisol Figueroa

(57) ABSTRACT

An indicator of a channel capacity of a wireless link between a wired telephone and a wireless hands free device is measured. Based on the indicator of the channel capacity, a call server decides whether to route a call to the wired telephone. The indicator of channel capacity may be is based on measurements of channel capacity between the telephone and the wireless hands free device taken at different times and at different locations. The measurements of channel capacity may be used to construct a map relating physical location and time to channel capacity available between one or more wired telephones and wireless hands free devices. The available channel capacity can also be used to cause indicators associated with low channel capacity to be displayed by the wired telephone or signaled to the wireless hands free device.

20 Claims, 5 Drawing Sheets

WIRELESS ENTERPRISE CONGESTION MANAGEMENT

BACKGROUND

Many businesses use call-handling or call-distributing systems as part of their enterprise. Call centers may provide part of their customer interaction. For example, a utility company may use a call-handling system to receive service requests. A mail order catalog may use a call-handling system to take orders. A medical office may use a call-handling system to make appointments. Computer hardware and software firms may use a call-handling system to provide customer support.

When an incoming call is received at a call center or enterprise site, call server may route the call to an available agent. This may be done on a first in first out basis. In other words, the agent who has been free the longest time is assigned to service the next incoming call. The agent is then connected to the caller so that the agent may assist the caller. If the call is directed to a specific person or number, the call may be directed directly to a telephone associated with that person.

SUMMARY

An embodiment of the invention may therefore comprise a method of operating a communication system, comprising: receiving an indicator of a channel capacity of a wireless link between a wired telephone and a wireless hands free device; and, based on the indicator of the channel capacity, determining whether to route a call to the wired telephone.

An embodiment of the invention may therefore further comprise a communication system, comprising: a plurality of wired telephones coupled to a plurality of wireless hands free devices, respectively, the plurality of wired telephones including a first telephone coupled to a first wireless hands free device; and, a call server configured to route calls to the plurality of wireless hands free devices via the plurality of telephones, the call server configured to receive a first indicator of a first channel capacity of a first wireless link between the first telephone and the first wireless hands free device.

An embodiment of the invention may therefore further comprise a method of operating a communication system, comprising: determining an indicator of a channel capacity of a wireless link between a wired telephone and a wireless hands free device; based on the indicator of the channel capacity, signaling a user of the wireless hands free device that the indicator of channel capacity meets a threshold requirement.

DETAILED DESCRIPTION OF THE EMBODIMENTS

Figure 1:
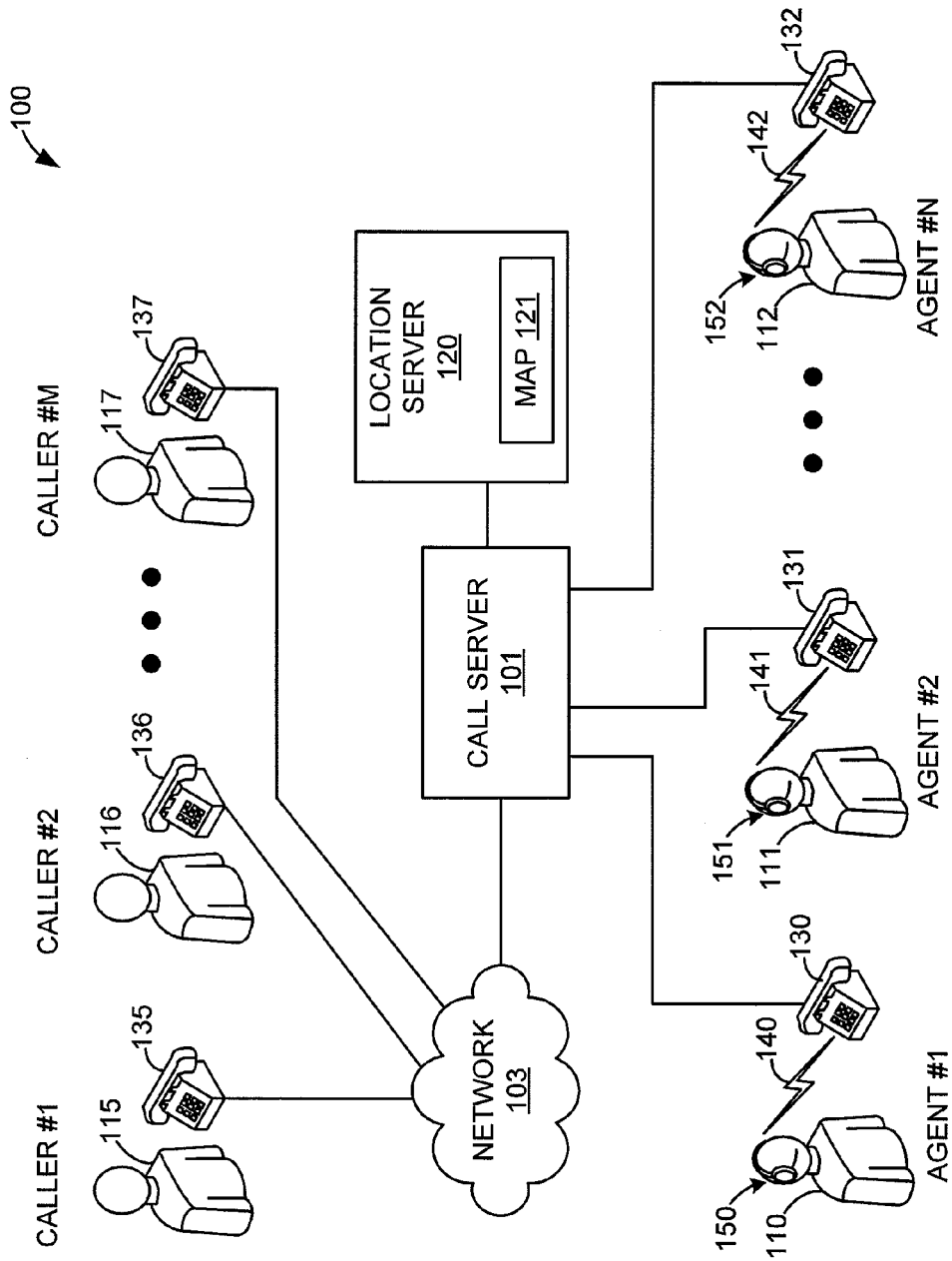
FIG. 1 is a block diagram illustrating a telephone system.

FIG. 1 is a block diagram illustrating a telephone system. Communication system 100 comprises call server 101, network 103, agents 110-112, wired telephones 130-132, callers 115-117, location server 120, caller telephones 135-137, wireless links 140-142, and wireless hands free devices 150-152. Location server 120 includes map 121. Location server 120 is operatively coupled to call server 101. Wired telephones 130-132 are operatively coupled to call server 101. Network 103 is operatively coupled to network 103. Network 103 is operatively coupled to caller telephones 135-137.

Callers 115-117 may use caller telephones 135-137, respectively, to place calls via network 103. Network 103 operatively links caller telephones 135-137 to call server 101. Call server 101 may assign incoming calls to wired telephones 130-132. Call server 101 may route incoming calls to wired telephones 130-132 according to a number dialed by callers 115-117. Agents 110-112 use wired telephones 130-132, respectively, to service these incoming calls. Agents 110-112 may also use wireless hands free devices 150-152 communicating via wired telephones 130-132, respectively, to service incoming and/or outgoing calls. Thus, agents 110-112 may use voice communication exchanged via caller telephones 135-137 through network 103, wired telephones 130-132, and hands free devices 150-152 to assist callers 115-117.

Caller telephones 135-137 and wired telephones 130-132 may be any device, system, combination of devices, or other such communication platform capable of communicating audio via network 103. Any of caller telephones 135-137 or wired telephones 130-132 may be, for example, an expanded function telephone, a mobile phone, a wireless modem, a personal digital assistant (PDA), a computer system with a sound input, output, and an internet connection, a computer with a public switched telephone network (PSTN) connection, a computer with a network card, an access terminal, a voice over internet protocol (VoIP) phone, a voice over packet (VOP) phone, or a soft phone, as well as other types of devices or systems that can exchange audio via network 103.

Network 103 may be any network or collection of networks that couple, link, or otherwise operatively link caller telephones 135-137 with wired telephones 130-132. In addition, other secondary data networks could be used. In an example, network 103 may include a backhaul network, a local network, a long distance network, a packet network, or any combination thereof, as well as other types of networks.

Call server 101 may be a system or collection of systems or software that link or otherwise assign incoming calls from caller telephones 135-137 to wired telephones 130-132. Call server 101 may be, or include, but is not limited to, CTI technologies and applications such as intelligent private branch exchanges (PBXs), computerized automatic call distribution systems, call servers, fax servers, interactive voice response (IVR) systems, voice mail, messaging systems, and so on.

Taken together, agents 110-112, wired telephones 130-132, and call server 101 may comprise a call center or enterprise site. A call center may include, but is not limited to, outsourced customer centers, outsourced customer relationship management, customer relationship management, voice of the customer, customer interaction, customer center, multimedia customer center, remote office, distributed enterprise, work-at-home agents, remote agents, branch office, back office, performance optimization, workforce optimization, hosted customer centers, and speech analytics.

In an embodiment, one or more of agents 110-112 may use wireless hands free devices 150-152 to communicate via wired telephones 130-132, respectively. These wireless hands free devices 150-152 communicate via wireless links 140-142 to wired telephones 130-132, respectively. These wireless hands free devices 150-152 may include wireless headsets, wireless handsets, hands free modules, hearing aids, etc. The wireless technologies used to establish and communicate via wireless links 140-142 may include Digital Enhanced Cordless Telecommunications (DECT), Bluetooth™, frequency modulated (FM), wireless fidelity (Wi-Fi), private Wi-Fi, etc.

One or more of wired telephones 130-132 may determine a channel capacity of wireless links 140-142. This capacity (or capability) may be signaled by wired telephones 130-132 to call server 101 and/or network 103. The capacity of a wireless link 140-142 may be signaled using an indicator of channel capacity. The indicator of the channel capacity of a wireless link 140-142 may be used to route audio communications to a non-wireless interface of a respective wired telephone 130-132. The indicator of the channel capacity of a wireless link 140-142 may be used to route audio communications to a different wireless interface (e.g., different wireless technology) of a respective wired telephone 130-132. The indicator of the channel capacity of a wireless link 140-142 may be used to route a call to a different wired telephone 130-132. The indicator of the channel capacity of a wireless link 140-142 may be used to route a call to a voice mailbox associated with a wired telephone 130-132 and/or call server 101.

In an embodiment the indicator of the channel capacity of a wireless link 140-142 may be used to route a call to a wireless hands free devices 150-152 on a different air wave channel or to a different wireless technology. For example, the indicator of the channel capacity of a wireless link 140-142 may be used to route a call to a wireless hands free devices 150-152 on a different frequency band (e.g., 6 GHz band instead of 2 GHz band). In another example, the indicator of the channel capacity of a wireless link 140-142 may be used to route a call to a wireless hands free devices 150-152 using a different wireless technology (e.g., DECT instead of Bluetooth).

In an embodiment the indicator of the channel capacity of a wireless link (e.g., wireless link 140) may be used to dynamically reduce the bandwidth of other wireless link (e.g., wireless link 141 and/or wireless link 142) to accommodate a new incoming call. In particular, an indicator of the channel capacity that indicates insufficient channel capacity for a new call may be used to dynamically reduce the bandwidth of one or more of wireless links 140-142. In another example, communication system 100 may pre-emptively re-allocate wireless bandwidth across wireless links 140-142 such that higher priority wired telephones 130-132, wireless hands free devices 150-152, and/or call types get wireless capacity at the cost of a lower priority ones.

Wired telephones 130-132 and/or wireless hands free devices 150-152 may determine respective indicators of channel capacity by making measurements of the channel capacity of wireless links 140-142. The channel capacity of wireless links 140-142 may be affected by a variety of factors. Channel capacity limits can occur that prevent calls from using wireless links 140-142 from being used or setup. These limits on channel capacity can be due to the number of active wireless hands free device users in a local area around wired telephones 130-132 and/or wireless hands free devices 150-152 (i.e., co-channel or co-technology interference). These limits on channel capacity can also come from interference by other technologies that share the same frequency band. For example, some implementations of DECT and Wi-Fi (802.11) can share the 2.4 GHz frequency band.

Wired telephones 130-132 and/or wireless hands free devices 150-152 may use the indicator of channel capacity to determine a coder-decoder (codec) or codec configuration to use for communications via a wireless link 140-142. Wired telephones 130-132 and/or wireless hands free devices 150-152 may use the indicator of channel capacity to configure the codec such as bit rate or redundancy to use for communications via a wireless link 140-142. Wired telephones 130-132 and/or wireless hands free devices 150-152 may use the indicator of channel capacity to determine a modulation and coding scheme (MCS) to use for communications via a wireless link 140-142. Wired telephones 130-132 and wireless hands free devices 150-152 may use the indicator of channel capacity, and/or other factors, to negotiate a codec to use for communications via a wireless link 140-142.

Incoming calls to a wired telephone 130-132 that is coupled to a wireless hands free device 150-152 can connect with a selected (usually best, or highest quality) codec when the indicator of channel capacity corresponds to a high bandwidth available via the respective wireless link 140-142. A wired telephone 130-132 that is coupled to a wireless hands free device 150-152 can, in response to an incoming call, negotiate and select a lower bandwidth codec when the indicator of channel capacity corresponds to reduction in the bandwidth available via the respective wireless link 140-142. A wired telephone 130-132 that is coupled to a wireless hands free device 150-152 can negotiate and select a lower bandwidth codec during a call when the indicator of channel capacity corresponds to reduction in the bandwidth available via the respective wireless link 140-142.

Wired telephone 130-132 and/or call server 101 can refuse to connect (i.e., reject) a call when the indicator of channel capacity corresponds with too little bandwidth available via the respective wireless link 140-142. If a call is rejected, call server 101 may send signaling to network 103 to indicate congestion or the unavailability of a wired telephone 130-132. For example, call server 101 may send a congestion tone, a session initiation protocol (SIP) message 480 (temporarily unavailable), or SIP message 503 (service unavailable). If a call is rejected, communication system 100 (and call server 101, in particular) can be configured to reroute the rejected call. The rerouting may be configured to, for example: route the call to another wired telephone 130-132; route the call to a cellular network; or, route the call to voice messaging.

During times when the indicator of channel capacity corresponds with too little bandwidth available via a wireless link 140-142, such that calls could be, or are being, rejected, call server 101 may signal the user with unique alerting that calls may be rejected because the bandwidth available over the wireless link 140-142 does not meet a threshold amount of bandwidth. Call server 101 and/or wired telephone 130-132 may signal the user that the bandwidth available over the wireless link 140-142 is insufficient by, for example, a louder ringtone, an alternate ringtone, or a visual indicator (e.g., notice light, or flashing light on either wired telephone 130-132 and/or wireless hands free device 150-152). The signal that the bandwidth available over the wireless link 140-142 is insufficient may be used by the user to change their location to a location where there is sufficient bandwidth. The signal that the bandwidth available over the wireless link 140-142 is insufficient may be used by the user to answer the wired telephone 130-132 using a wired handset, wired speakerphone, etc.

In an embodiment, wired telephones 130-132 and/or wireless hands free devices 150-152 may collect information about the channel capacity of wireless links 140-142 over time. In other words, wired telephones 130-132 and/or wireless hands free devices 150-152 may repeatedly collect indicators of channel capacity associated with their respective wireless links 140-142 over time. This information may be correlated with location data and reported to location server 120 to construct map 121. Location data may be available from global positioning system (GPS) information, e911 information, or information from a layer 2 protocol (e.g., Link Layer Discovery Protocol—LLDP). Location server 120 may create a detailed map 121 of wireless capacity by location (a.k.a., geography) from the many indicators of channel capacity reported by each wired telephone 130-132 and/or each wireless hands free device 150-152. The channel capacity information collected may not depend on the wireless hands free device 150-152 being in use. Any wireless hands free device 150-152 can be used to collect channel capacity indicators and report them to location server 120 for use in constructing map 121 whether or not the wireless hands free device 150-152 and/or wired telephone 130-132 is in an active call.

Call server 101 and/or location server 120 may use map 121 to determine a current wireless channel capacity in the area of one or more locations of a wired telephones 130-132 and/or wireless hands free devices 150-152. This current wireless channel capacity in the area of a wired telephone 130-132 and/or wireless hands free device 150-152 may be used by call server to route a call to a wired telephone 130-132 and/or wireless hands free device 150-152. In this manner, call server 101 is better able to select a wired telephone 130-132 and/or wireless hands free device 150-152 before call setup signals a congestion response.

Map 121 can also be used in the engineering and management of communication system 100. Map 121 may indicate areas of excessive wireless channel congestion. SNMP traps may assist may aid in early identification of areas with excessive wireless channel congestion. Map 121 and/or the information collected about the channel capacity of wireless links 140-142 can be used to monitor congestion and the number of wireless hands free devices 150-152 in an area. A typical number of wireless hands free devices 150-152 in an area may be derived from map 121 and/or the information collected about the channel capacity of wireless links 140-142. This typical number of wireless hands free devices 150-152 in an area may be increased because map 121 allows a non-blocking infrastructure for communication system 100 to be configured. Erlang tables may be used to show and/or manage expected capacity under different models of wireless hands free device 150-152 usage.

Anomalies or other unexpected properties of map 121 and/or the information collected about the channel capacity of wireless links 140-142 can be used to detect possibly unknown wireless equipment in an area that is interfering with wireless links 140-142. Detecting this interference can lead to a reconfiguration of communication system 100 and/or the interference source to increase wireless channel capacity for one or more wireless links 140-142. Procedures for reconfiguring communication system 100 may be similar to how time division multiplexing (TDM) trunks are engineered. Thus, trunk congestion routing capabilities may be applied to wireless links 140-142. In the case of call centers or other installations that must use non-blocking rules, the knowledge of whether the channel capacity is blocked, or conditions are such that a wireless hands free device 150-152 is unusable allows an agent 110-112 to be associated in an unavailable status so that call server 101 does not route calls to that agent 110-112 (and/or wired telephone 130-132).

In an embodiment, communication system 100 may reserve bandwidth within a given geography. For example, call server 101 and/or location server 120 may use map 121 to determine a ensure that there is always a minimum amount of wireless channel capacity in the area of one or more locations of a wired telephones 130-132 and/or wireless hands free devices 150-152. This minimum amount of wireless channel capacity in the area of a wired telephone 130-132 and/or wireless hands free device 150-152 may be used by call server to ensure a call to a selected wired telephone 130-132 and/or wireless hands free device 150-152 will always complete.

In an embodiment, wired telephones 130-132 can display whether its associated wireless hands free device 150-152 is available. This allows a user 110-112 to see what interfaces are blocked and choose to make a call with a wired interface to wired telephone 130-132 instead. Since communication system 100 is aware (e.g., via map 121) of wireless capacity by location, wired telephones 130-132 may reduce power dedicated to its respective wireless link 140-142, enabling greater channel capacity in a given geography because of less interference created for other similar devices. Wired telephones 130-132 may signal (e.g., display to) a user 110-112 that its respective wireless link 140-142 has a limited usable distance. Wired telephones 130-132 may signal to a user 110-112 that its respective wireless link 140-142 has a limited usable distance using tones or a warning message (e.g., a recording) that is played through wireless hands free device 150-152.

Figure 2:
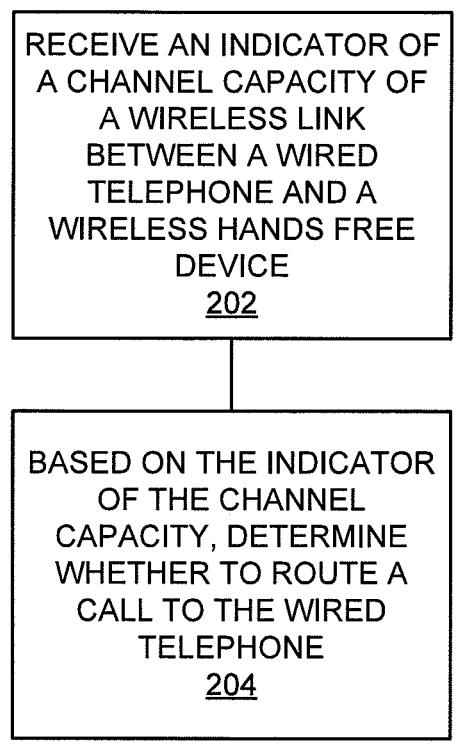
FIG. 2 is a flowchart illustrating a method of operating a communication system.

FIG. 2 is a flowchart illustrating a method of operating a communication system. The steps illustrated in FIG. 2 may be performed by one or more elements of communication system 100. An indicator of a channel capacity of a wireless link between a wired telephone and a wireless hands free device is received (202). For example, call server 101 may receive, via wired telephone 130, an indicator associated with the channel capacity of wireless link 140. In another example, location server 120 may receive indicators associated with the channel capacity of wireless link 140 over time. The indicators received by location server 120 may be associated with a location(s) of wireless device 150.

Based on the indicator of the channel capacity, whether to route a call to the wired telephone is determined (204). For example, call server 101 may decide not to route a call to wired telephone 130 because the channel capacity associated with wireless link 140 indicates the call will be rejected. In another example, call server 101 may decide not to route a call to wired telephone 130 because location server 120 and/or map 121 indicate that the channel capacity associated with wireless link 140 is likely to be poor and/or result in the call being rejected.

Figure 3:
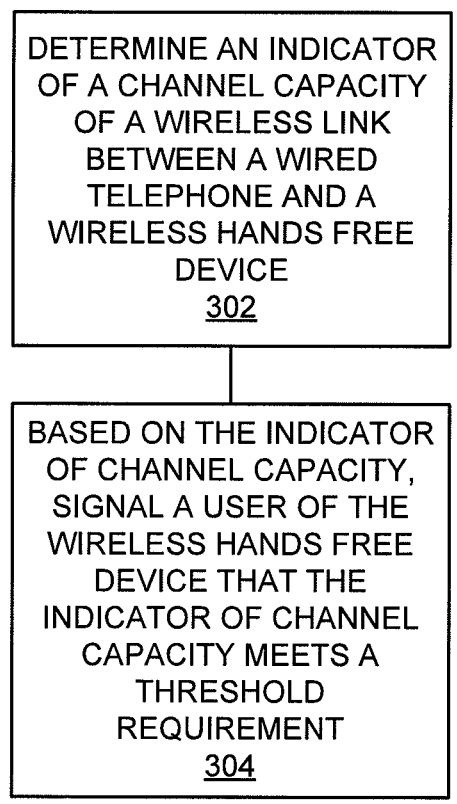
FIG. 3 is a flowchart illustrating a method of signaling a user using a telephone system.

FIG. 3 is a flowchart illustrating a method of signaling a user using a telephone system. The steps illustrated in FIG. 3 may be performed by one or more elements of communication system 100. An indicator of a channel capacity of a wireless link between a wired telephone and a wireless hands free device is determined (302). For example, wireless telephone 131 and/or wireless hands free device 151 may determine an indicator that is associated with the channel capacity of wireless link 141. In another example, location server 120 may determine an indicator that is associated with a likely channel capacity of wireless link 141 based on map 121 and/or previously reported channel capacities in the area of wireless telephone 131 and/or wireless hands free device 151.

Based on the indicator of channel capacity, a user of the wireless hands free device is signaled that the indicator of channel capacity meets a threshold requirement (304). For example, based on an indicator of channel capacity meeting a threshold requirement that is associated with a call being rejected, wireless telephone 131 and/or wireless hands free device 151 may signal user 111 that wireless hands free device 151 is out-of-range and/or excessive congestion exists. In another example, based on an indicator of channel capacity meeting a threshold requirement that is associated with wireless hands free device 151 being out-of-range (or likely being out-of-range based on map 121), wired telephone 131 and/or wireless hands free device 151 may signal user 111 to either move back in range, or use a different interface to wired telephone 131.

Figure 4:
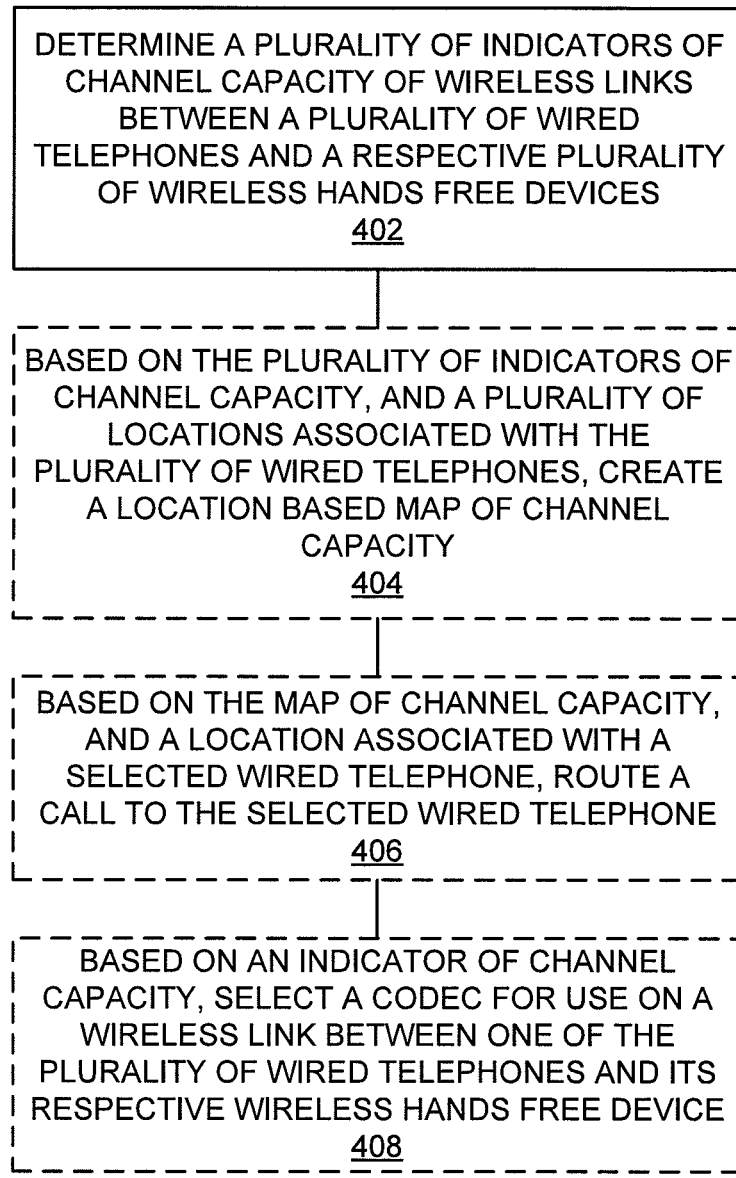
FIG. 4 is a flowchart illustrating methods of using channel capacity indicators.

FIG. 4 is a flowchart illustrating methods of using channel capacity indicators. The steps illustrated in FIG. 4 may be performed by one or more elements of communication system 100. A plurality of indicators of channel capacity of wireless links between a plurality of wired telephones and a respective plurality of wireless devices is determined (402). For example, wired telephones 130-132 and/or wireless hands free devices 150-152 may repeatedly determine channel capacity indicators associated with wireless links 140-142 over time. These channel capacity indicators may be associated with one or more locations of wired telephones 130-132 and/or wireless hands free devices 150-152.

Based on the plurality of indicators of channel capacity, and a plurality of locations associated with the plurality of wired telephone, a location based map of channel capacity is optionally created (404). For example, the indicators of channel capacity associated with wireless links 140-142 over time and location that are reported to location server 120 may be used to construct map 121. Map 121 may relate location information to channel capacity. Map 121 may further relate location information and channel capacity to time.

Optionally, based on the map of channel capacity, and a location associated with a selected wired telephone, a call is routed to the selected wired telephone (406). For example, based on map 121, one of wired telephones 130-132 may be selected to receive a call. The selected one of wired telephones 130-132 may be selected based on map 121 indicating that the location of the selected one of wired telephones 130-132 is likely to have over-the-air conditions sufficient to complete the call via its respective wireless hands free device 150-152.

Optionally, based on an indicator of channel capacity, a codec of different bandwidth density is selected for use on a wireless link between one of the plurality of wired telephones and its respective wireless hands free device (408). For example, based on an indicator of channel capacity associated with wireless link 142, wired telephone 132 and/or wireless hands free device 152 may select a codec for use on link 142. In another example, based on an indicator of channel capacity that is based on map 121, call server 101, wired telephone 132 and/or wireless hands free device 152 may select a codec for use on link 142.

The methods, systems, devices, networks, servers, and telephones described above may be implemented with, contain, or be executed by one or more computer systems. The methods described above may also be stored on a non-transitory computer readable medium. Many of the elements of communication network 100 may be, comprise, or include computers systems. This includes, but is not limited to: call server 101, network 103, wired telephones 130-132, location server 120, caller telephones 135-137, and wireless hands free devices 150-152.

Figure 5:
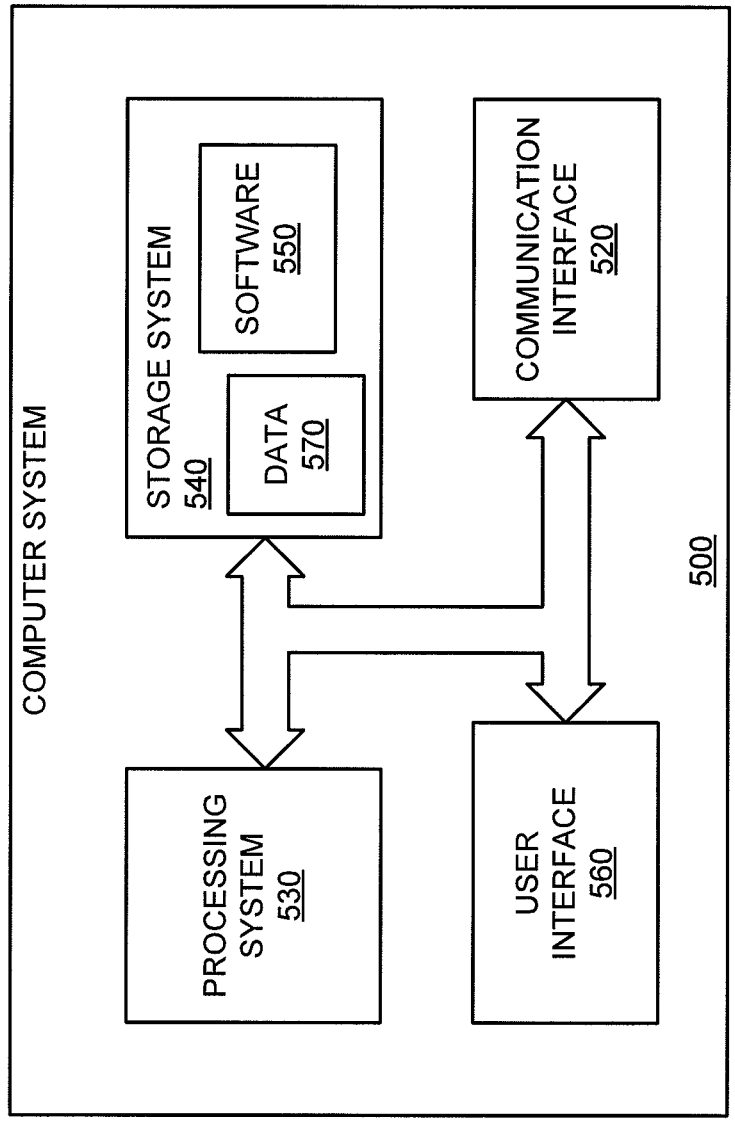
FIG. 5 is a block diagram of a computer system.

FIG. 5 illustrates a block diagram of a computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, network storage, server, or other memory function. Storage system 540 may be a computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 530 may create or modify software 550 or data 570 to achieve a tangible result. Processing system 530 may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of operating a communication system, comprising:

establishing a wireless link for audio communication between a wired telephone and a wireless hands free device, the wired telephone having a two-way non-wireless audio user interface and a wireless interface, the wireless link being established via the wireless interface of the wired telephone;

determining, by the wired telephone, an indicator of the minimum communication bandwidth available via the wireless link;

receiving, from the wired telephone, the indicator of the minimum communication bandwidth available via the wireless link; and, based on the indicator of the minimum communication bandwidth available via the wireless link, determining whether to route a call to the two-way non-wireless audio user interface of the wired telephone.

2. The method of claim 1, wherein the indicator of the minimum communication bandwidth available via the wireless link is based on measurements of channel capacity between the wired telephone and the wireless hands free device.

3. The method of claim 1, wherein, based on the indicator of the minimum communication bandwidth available via the wireless link, the wired telephone displays an indicator that the wireless hands free device is not available.

4. The method of claim 1, further comprising:
receiving a plurality of indicators of channel capacity of established wireless links between a plurality of wired telephones and a respective plurality of wireless hands free devices; and,
based on the a plurality of indicators of channel capacity and the indicator of the minimum communication bandwidth available via the wireless link, routing the call to the two-way non-wireless audio user interface of the wired telephone.

5. The method of claim 1, further comprising:
receiving a plurality of indicators of channel capacity of established wireless links between a plurality of wired telephones and a respective plurality of wireless hands free devices; and,
based on the a plurality of indicators of channel capacity, and a plurality of locations of associated with the plurality of wired telephones, creating a location based map of channel capacity.

6. The method of claim 5, further comprising:
routing a second call to a selected one of the plurality of wired telephones based on the location based map of channel capacity and a location associated with the selected one of the plurality of wired telephones.

7. The method of claim 1, further comprising:
receiving, by the wired telephone, signaling information from the wireless hands free device that corresponds to the capacity of the wireless link between the wired telephone and the wireless hands free device.

8. The method of claim 7, further comprising:
based on the signaling information, selecting a codec configuration for use on the wireless link between the wired telephone and the wireless hands free device.

9. A communication system, comprising:
a plurality of wired telephones each wirelessly coupled to a respective one of a plurality of wireless hands free devices, each of the plurality of wired telephones having a two-way non-wireless audio user interface and a wireless interface, each of the wired telephones determining a respective indicator of a minimum communication bandwidth available for audio communication with the respective wireless hands free device, each of the wired telephones determining whether to route calls to a respective two-way non-wireless audio user interface based on the respective indicator of the minimum communication bandwidth available for audio communication with the respective wireless hands free device;
the plurality of wired telephones including a first wired telephone wirelessly coupled to a first wireless hands free device, the first wired telephone wirelessly coupled to the first wireless hands free device via the wireless interface of the first wired telephone, the first wired telephone determining a first respective indicator of the minimum communication bandwidth available for audio communication with the first wireless hands free device; and,
a call server configured to route calls to the plurality of wired telephones, the call server configured to receive the respective indicators of the minimum communication bandwidth available for audio communication with the respective wireless hands free device.

10. The communication system of claim 9, wherein the call server is configured to select the first wired telephone for a call based on the first respective indicator.

11. The communication system of claim 9, wherein the call server is configured to select for a call, based on the first respective indicator, one of the plurality of wired telephones that is not the first wired telephone.

12. The communication system of claim 9, wherein the first respective indicator indicates to the call server whether the first wired telephone has enough minimum communication bandwidth available for audio communication with the first wireless hands free device to answer a call using the first less hands free device.

13. The communication system of claim 9, wherein the first wired telephone rejects a call based on the first respective indicator.

14. The communication system of claim 9, wherein the first wired telephone selects a codec for a call based on the first respective indicator.

15. The communication system of claim 9, wherein, in response to a call, the call server signals the first wired telephone is unavailable based on the first respective indicator.

16. The communication system of claim 9, wherein, in response to a call, the call server routes the call to a voice messaging service based on the first respective indicator.

17. A method of operating a communication system, comprising:
determining, by a wired telephone having a two-way non-wireless audio user interface and a wireless interface, a minimum communication bandwidth available for audio communication via an established wireless link between the wired telephone and a wireless hands free device;
based on the minimum communication bandwidth available for audio communication via the established wireless link, signaling a user of the wireless hands free device that the minimum communication bandwidth available for audio communication meets a threshold requirement; and,
based on the minimum communication bandwidth available for audio communication via the established wireless link, determining whether to route audio communication associated with a call to a two-way non-wireless audio interface of the wired telephone.

18. The method of claim 17, wherein the threshold requirement corresponds to a sufficient minimum available communication bandwidth between the wired telephone and the wireless hands free device.

19. The method of claim 18, wherein the user is signaled using a first ringtone if the threshold requirement is met and a second ringtone if the threshold requirement is not met.

20. The method of claim 19, further comprising:
routing, by a call server, the call to the d telephone based on based on the threshold requirement being met.

* * * * *